UNITED STATES PATENT OFFICE.

RENÉ ADOLPHE LE MÂITRE, OF BRUSSELS, BELGIUM.

PROCESS OF MAKING AGGLOMERATES AND AGGLUTINANTS.

No. 826,948. Specification of Letters Patent. Patented July 24, 1906.

Application filed August 14, 1905. Serial No. 274,184.

*To all whom it may concern:*

Be it known that I, RENÉ ADOLPHE LE MÂITRE, a subject of the King of Belgium, residing at Ixelles-Brussels, in the Kingdom of Belgium, have invented certain new and useful Improvements in Processes of Making an Agglomerate and Agglutinant, of which the following is a specification.

This invention relates to a process for the manufacture of a new agglutinant and agglomerating substance which is very combustible and is especially intended for the manufacture of combustible agglomerates or briquets, but can be used also either alone or mixed with other substances for forming other plastic bodies, as well as for paint, coating, lubricating materials, and the like.

The base of this new substance is constituted by hydrocarbons, such as mineral oils. Agglutinant substances obtained by the process according to this invention besides being combustible and having great calorific and agglomerating power have also the advantage of being very cheap and easily to manufacture and of being produced in a shape specially adapted for transport and for application for the manufacture of briquets or agglomerates.

The process according to this invention chiefly consists in modifying the state of the hydrocarbon used by molecular condensation until a certain resinification takes place and in such manner as to give it in a new, more compact, and more finely-divided state a great agglomerating power without affecting its combustibility and heating power.

Molecular condensation of hydrocarbons is effected in any well-known manner—for example, as described by Dr. Lassar Cohn in his work on the "*Methodes de Travail pour les Laboratoires de Chimie Organique*"—that is to say, by acting by means of a condensation agent on nitrated, chlorinated, or oxidized derivatives or compounds in the presence of the hydrocarbon used.

The operation is preferably effected in a closed vessel and at a high temperature.

Nitrated or chlorinated derivatives or compounds used in this process are obtained by sulfo-nitric or chloro-nitric mixture of any organic substances, preferably of animal origin, such as the exudation from the sebaceous glands, known in commerce under the name of "suint," "cholesterine," "raw lanolin," &c. The refuse or the products of purification of the residual water from wool-washing establishments, &c., can be used with advantage.

Blood, excremental substances, meat refuse, &c., can also be used.

The best hydrocarbons for the object in question are those of high density, (say from 0.75° to 0.95°,) such as the residue of the distillation of mineral oils, (masut, astatki, fuel-oils, &c.;) but also raw mineral oils can be used.

As condensation agents baryta, calcium hydrate, sodium hydrate, (this substance, it is true, gives less favorable results,) chlorid of zinc, &c., and in certain special conditions chlorid of aluminium may be employed.

The following is an example of one way of carrying out the process according to this invention on an industrial basis. One hundred kilograms of suint or of raw lanolin are treated with two kilograms of a mixture of two parts of sulfuric acid and of three parts of commercial nitric acid and thoroughly stirred at a high temperature until an ether smell becomes noticeable and yellowish fumes appear. At this moment a certain quantity of alkaline water for stopping or quieting the reaction and preventing carbonization of the mass is quickly added hot, the stirring being continued all the time. The resultant mass is afterward subjected to compression, filtration, or other improved means for separating liquid from the solids and the remaining solids then dried, then introduced into one thousand kilograms of heavy mineral oil arranged in an air-tight boiler or autoclave in the presence of ten kilograms of baryta or an approximately similar quantity of caustic lime. On the introduction of these substances the boiler is exposed to a temperature of 300° to 600° centigrade, care being taken to allow from time to time the gases, ammonia fumes, &c., to escape and the condensation is allowed to continue until the mass becomes resinified to a certain extent. This mass is cast into molds, where it solidifies and becomes harder on cooling and can be dried by the action of the atmospheric air. The drying can be accelerated by ventilation by means of a current of dry and cold air. The mass thus obtained constitutes the new agglutinant and agglomerating material. It is in a solid state and has a more or less great consistency. It is homogeneous, sticky to the touch, and has a specific gravity varying from 0.90° to 0.99°

It melts between 80° and 90° centigrade and has a very high flash point of 300° centigrade. It is insoluble in water.

According to this invention the new agglutinant substance is chiefly intended to be used as a suitable agglomerating substance for combustible agglomerative mixtures and at the same time to greatly increase the heating power of the latter. In view of its agglutinant power it can, however, be also used either alone or mixed with other substances for producing plastic bodies or materials, and in view of its impermeability it can be used as a coating composition or paint. It also has very advantageous lubricating properties and can therefore be used as a consistent lubricant. In certain cases this substance in order to be applied will have to be liquefied or melted or treated by some solvent or diluent, such as naphtha, carbon sulfid, carbon tetrachlorid, &c. Owing to its solid state, it can be easily transported, either in the form of molded blocks, as hereinbefore specified, or in suitable tanks, or in bulk. It can be mixed in various proportions with combustible agents, preferably reduced to powder and made as dry—that is to say, deprived of water—and ground as finely as possible; the power of the combustible agent to absorb the material depending largely on its state of division and degree of dryness.

The agglutinants and agglomerating substances formed in accordance with this invention are used for various purposes as forming fuel briquets by uniting with combustible agents. Almost any combustible material may be used in connection with the manufacture of the briquets—such, for instance, as coal-dust, lignite, peat, coke, charcoal-dust, and the like.

It is necessary to point out a very important advantage in the utilization of the new material, which consists in the fact that when mixed in the desired conditions with very poor fuel-dust—such as lignite, peat, &c.—it produces briquets which can be transformed into coke and advantageously used for metallurgical purposes.

What I claim as my invention, and desire to secure by Letters Patent, is—

1. The process of making a combustible agglutinant and agglomerating substance, consisting in treating substantially one hundred parts by weight of suint with two parts by weight of a mixture containing forty per cent. sulfuric acid and sixty per cent. nitric acid, stopping the reaction by the addition of an alkaline solution, extracting the water, drying the sulfo-nitrates obtained, introducing into substantially one thousand parts by weight of heavy hydrocarbon mineral oil in the presence of ten parts by weight of an active condensation agent and causing the reaction to take place in a closed vessel at a high temperature until resinification of the mass takes place.

2. The process of making a combustible agglutinant and an agglomerating substance consisting in treating substantially one hundred parts by weight of suint with two parts by weight of a mixture containing forty per cent. sulfuric acid and sixty per cent. nitric acid, stopping the reaction by the addition of an alkaline solution, extracting the water, drying the nitrates obtained, introducing the nitrates into substantially one thousand parts by weight of heavy hydrocarbon mineral oil in the presence of substantially ten parts by weight of baryta and causing the reaction to take place in a closed vessel at high temperature until resinification of the mass takes place.

In testimony whereof I have signed my name to this specification in the presence of two subscribing witnesses.

RENÉ ADOLPHE LE MAÎTRE.

Witnesses:
A. GRAY,
GREGORY PHELAN.